United States Patent [19]

Cummings

[11] E Patent Number: Re. 33,720

[45] Reissued Date of Patent: Oct. 22, 1991

[54] SKYLIGHT ASSEMBLY

[76] Inventor: Peter A. Cummings, 655 Pine St., Harbor Springs, Mich. 49740

[21] Appl. No.: 177,958

[22] Filed: Apr. 5, 1988

Related U.S. Patent Documents

Reissue of:

[64] Patent No.: 4,589,239
Issued: May 20, 1986
Appl. No.: 728,842
Filed: Apr. 30, 1985

[51] Int. Cl.[5] ..... E04D 13/03; E04B 7/18

[52] U.S. Cl. ..... 52/200; 52/72

[58] Field of Search ..... 52/22, 72, 200, 204, 52/207, 213, 397

[56] References Cited

U.S. PATENT DOCUMENTS

| | | | |
|---|---|---|---|
| 241,972 | 5/1881 | Gouch | 52/200 |
| 412,313 | 10/1889 | Weis et al. | |
| 540,821 | 6/1895 | Smith | |
| 764,965 | 7/1904 | Tousley | |
| 817,002 | 4/1906 | Rasmussen | 52/72 |
| 1,211,053 | 1/1917 | Bernard | |
| 2,182,852 | 12/1939 | Mulford | |
| 2,842,073 | 7/1958 | Huston et al. | 52/200 |
| 2,918,023 | 12/1959 | Bettcher | 52/200 X |
| 3,325,951 | 6/1967 | Johnson | 52/200 X |
| 3,983,669 | 10/1976 | Bogaert | |
| 4,173,854 | 11/1979 | Wallerstein | 52/200 |
| 4,190,987 | 3/1980 | Naidus | |
| 4,193,237 | 3/1980 | Jankowski | |
| 4,194,498 | 3/1980 | Mayerovitch | 52/200 X |
| 4,520,604 | 6/1985 | Halsey | 52/200 |
| 4,610,116 | 9/1986 | Schultz | 52/72 X |
| 4,733,505 | 3/1988 | Van Dame | 52/200 X |

FOREIGN PATENT DOCUMENTS

| | | | |
|---|---|---|---|
| 74858 | 10/1952 | Denmark | 52/200 |
| 1098699 | 2/1961 | Fed. Rep. of Germany | 52/72 |
| 2263565 | 7/1974 | Fed. Rep. of Germany | 52/200 |
| 2650090 | 5/1978 | Fed. Rep. of Germany | 52/72 |
| 2142733 | 7/1978 | Fed. Rep. of Germany | |
| 233372 | 7/1944 | Switzerland | 52/200 |

OTHER PUBLICATIONS

Fine Homebuilding "Curbless Skylight" by Rob Thallon Dec. 1983/Jan. 1984 pp. 36–39.

*Primary Examiner*—Richard E. Chilcot, Jr.
*Attorney, Agent, or Firm*—Ralph M. Burton

[57] ABSTRACT

A skylight assembly for a sloping roof is mounted so that the upper end may be tucked beneath the roof covering so that rain water will drain onto an outer skylight panel; the panel is concave and its lower end extends over the roof covering so that rain water will drain from the panel onto such covering; within and beneath the skylight there is an inner skylight panel mounted for movement to permit ventilation of the room beneath.

19 Claims, 5 Drawing Sheets

FIG. 6
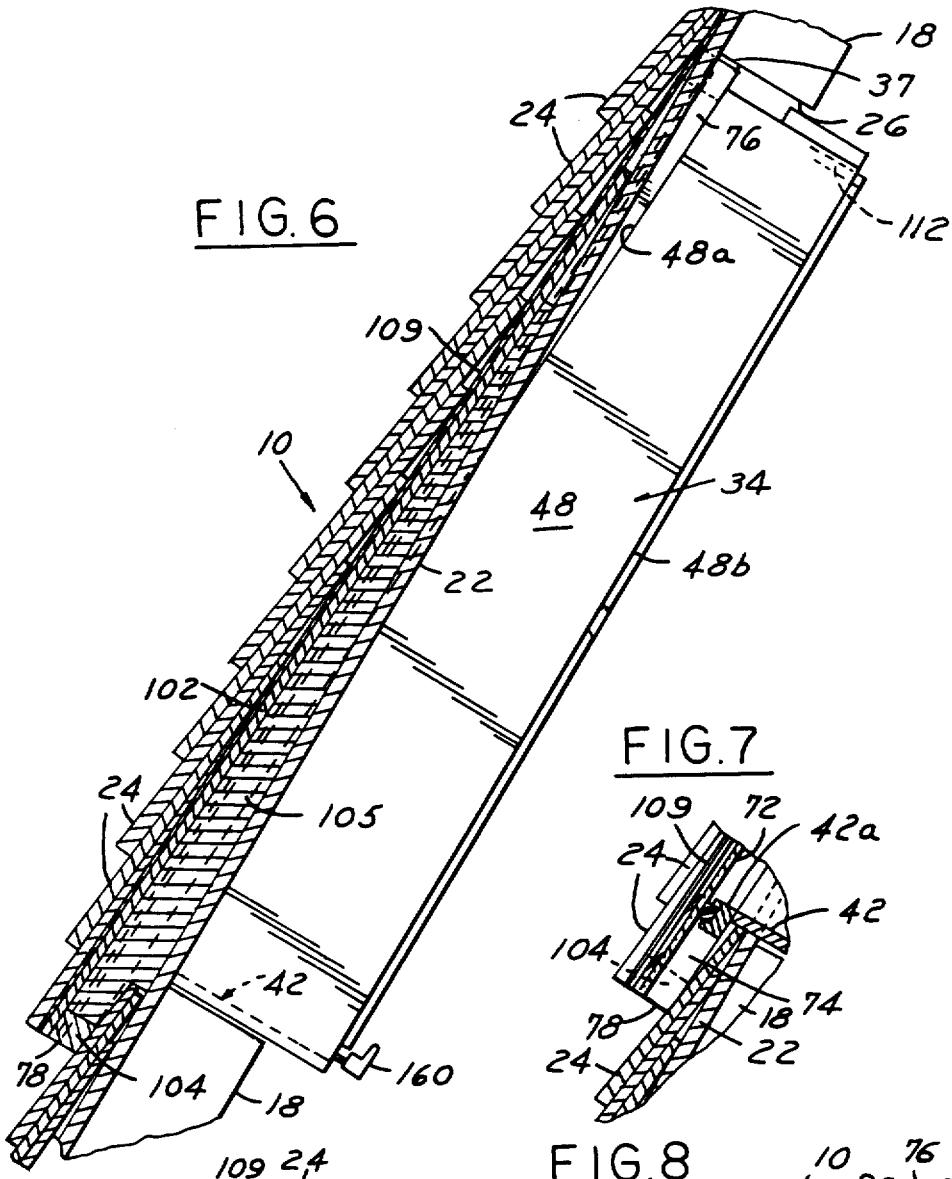
FIG. 7
FIG. 8
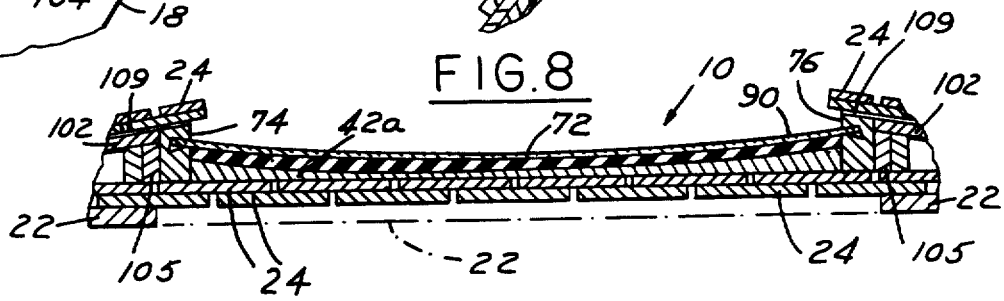

SKYLIGHT ASSEMBLY

Matter enclosed in heavy brackets [ ] appears in the original patent but forms no part of this reissue specification; matter printed in italics indicates the additions made by reissue.

DESCRIPTION

1. Field of Invention

This invention relates to a skylight assembly for a sloping roof.

2. Background of Invention

In providing a skylight for sloping roofs, there have been long-standing problems in making the skylight weather-tight at the joints with the roof, in particular, preventing water from leaking along the edges of the skylight into the room below. In addition, there has been a need to provide a skylight construction which will enable it to be readily installed in an existing roof in an expeditious manner and which will be weather-tight when the installation is completed.

There has also been a need to provide a skylight in which the skylight panel could be readily replaced in the event of its damage. In addition, there has been a need to provide a skylight design which would enable the skylight panel to admit light to the room below while at the same time insulating the panel to prevent heat losses therethrough. In addition, there has been the need to provide a skylight which will not be readily frosted by humidity within the room below, but which will be kept clear thereof by natural drafts within the building structure.

SUMMARY OF THE INVENTION

I have developed a skylight assembly which may be readily insulated in an existing roof structure in an expeditious manner and which will not unpleasingly interfere with the roofline and which may be readily sealed against the weather. The design is such that water on the skylight is channeled to the center line and may run off harmlessly onto the shingles or other roof covering on the slope below the skylight. In addition, the skylight panel may be readily removed for replacement or repair. The skylight panel is insulated from the room below the skylight by a separate inner skylight panel which is mounted for movement to permit ventilation of the room below. In addition, the space between the outside and inside skylight panels is vented to the space between the roof and the ceiling of the room in which the skylight is mounted whereby air movement through such space is promoted and frosting of the skylight thereby reduced.

BRIEF DESCRIPTION OF THE DRAWINGS

FIG. 6 is an exploded view taken on the line 6—6 of FIG. 1;

FIG. 7 is a fragmentary cross-sectional view taken on the line 7—7 of FIG. 3;

FIG. 8 is a fragmentary cross-sectional view taken on the line 8—8 of FIG. 2;

BRIEF DESCRIPTION OF PREFERRED EMBODIMENT

Figure 1:
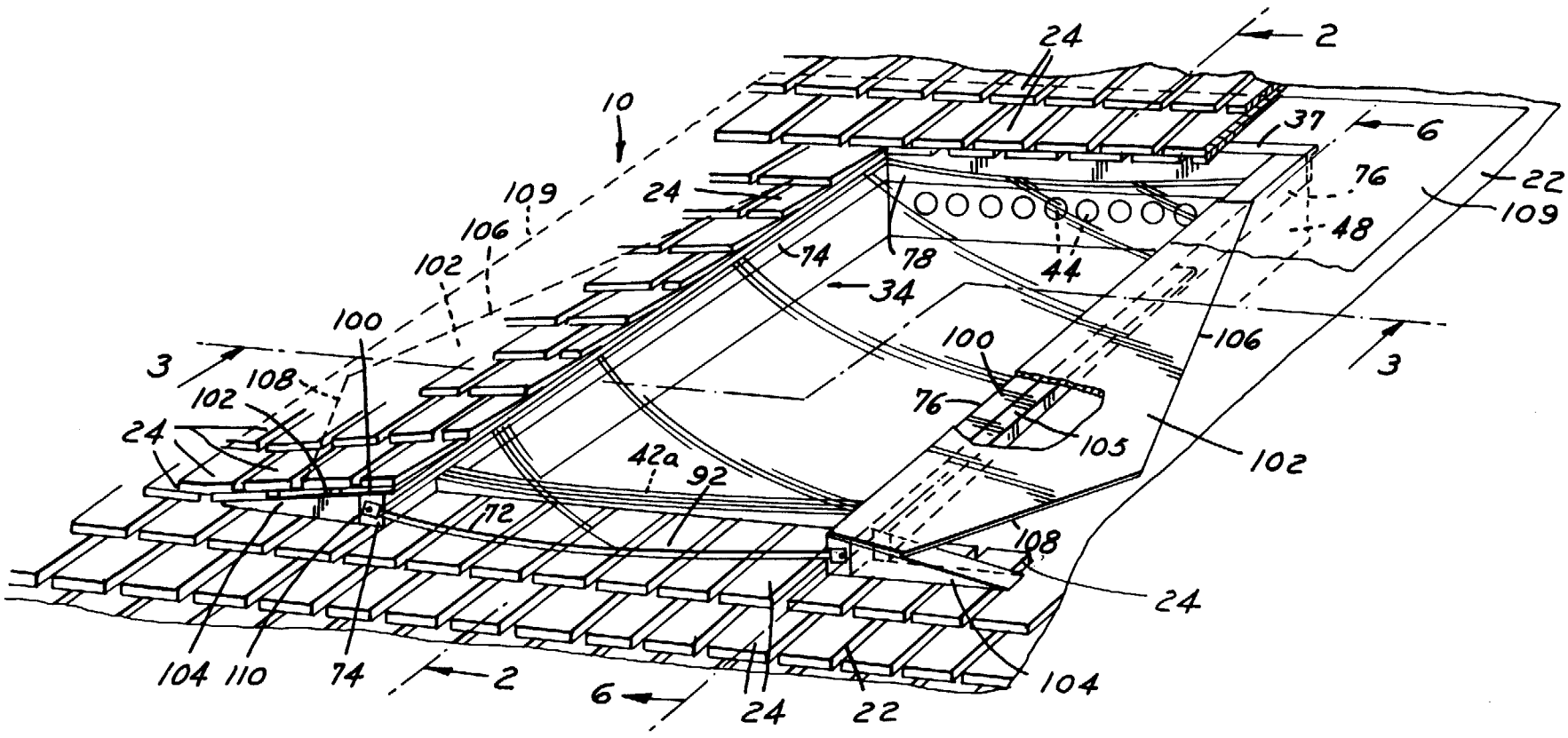
FIG. 1 is a perspective view with some of the shingles removed for clarity showing my skylight mounted in a sloping roof.

A skylight assembly embodying my invention is shown in FIG. 1 mounted in the sloping roof 10 of a building structure. In the drawings, rafters 14 (see FIG. 3) extend from the peak to the eaves along opposite sides of the skylight assembly with transverse members 16 (see FIG. 2) extending between rafters 14 and framing the opening within which the skylight assembly is disposed. Overlying the rafters 14 and the transverse members 16 is an underlament 18 such as plywood sheeting. Over the sheeting is insulation 20. Spaced above the insulation are roof boards 22 to which the shingles 24 are secured. Roof constructions may vary somewhat from that herein depicted, but in general, they will comprise rafters, sheeting on the rafters, insulation either above or below the sheeting and shingles overlying the whole.

My skylight assembly is intended to be mounted in a conventional sloping roof of the general construction above-described by cutting a hole 26 (see FIG. 3) in the roof of a size and shape to complement the skylight casing (hereinafter described), framing such opening with tranverse members 16 which will extend between the rafters 14 as above-mentioned. The opening may be further framed with side members 28, a header member 30 and a bottom member 32 whereby the opening in the roof is not only structurally supported but the opening is also neatly finished off.

The skylight assembly comprises a rectangular casing 34 which may be built of wood or any other suitable material, consisting of a header rail 36, opposed side rails 38 and 40 and a bottom rail 42. The rails are secured together at their meeting corners. The header and bottom rails may be provided with vent means in the form of apertures 44 and 46 to permit air blow beneath the roof through the space within the casing. The side rails 38 and 40 are of identical construction. Each includes, when the frame is formed of wood, three numbers 48, 50 and 52, secured together by any suitable fastening. Members 48 are connected at opposite ends to the header and bottom rails 36 and 42. The members 50 overlie the members 48 on the inside of the frame and are cut diagonally at 54 (see FIG. 2) to provide a space between the side rails through which the inside skylight panel 111 may pivot as shown in phantom outline in FIG. 2, and to limit the opening movement of such panel. The member 52 extends downwardly along the lower edge of the member 48 from the pivot 129 for the inside panel to the bottom rail 42 and provides a ledge for a seal at 53 when the inner panel is closed. Another seal is provided along edge 55 of member 50 when the inner panel is closed. Another ledge for a seal is provided by member 56 along the lower edge of bottom rail 42 as shown in FIG. 2, and another edge seal is provided along the bottom edge 57 of the header rail.

Figure 2:
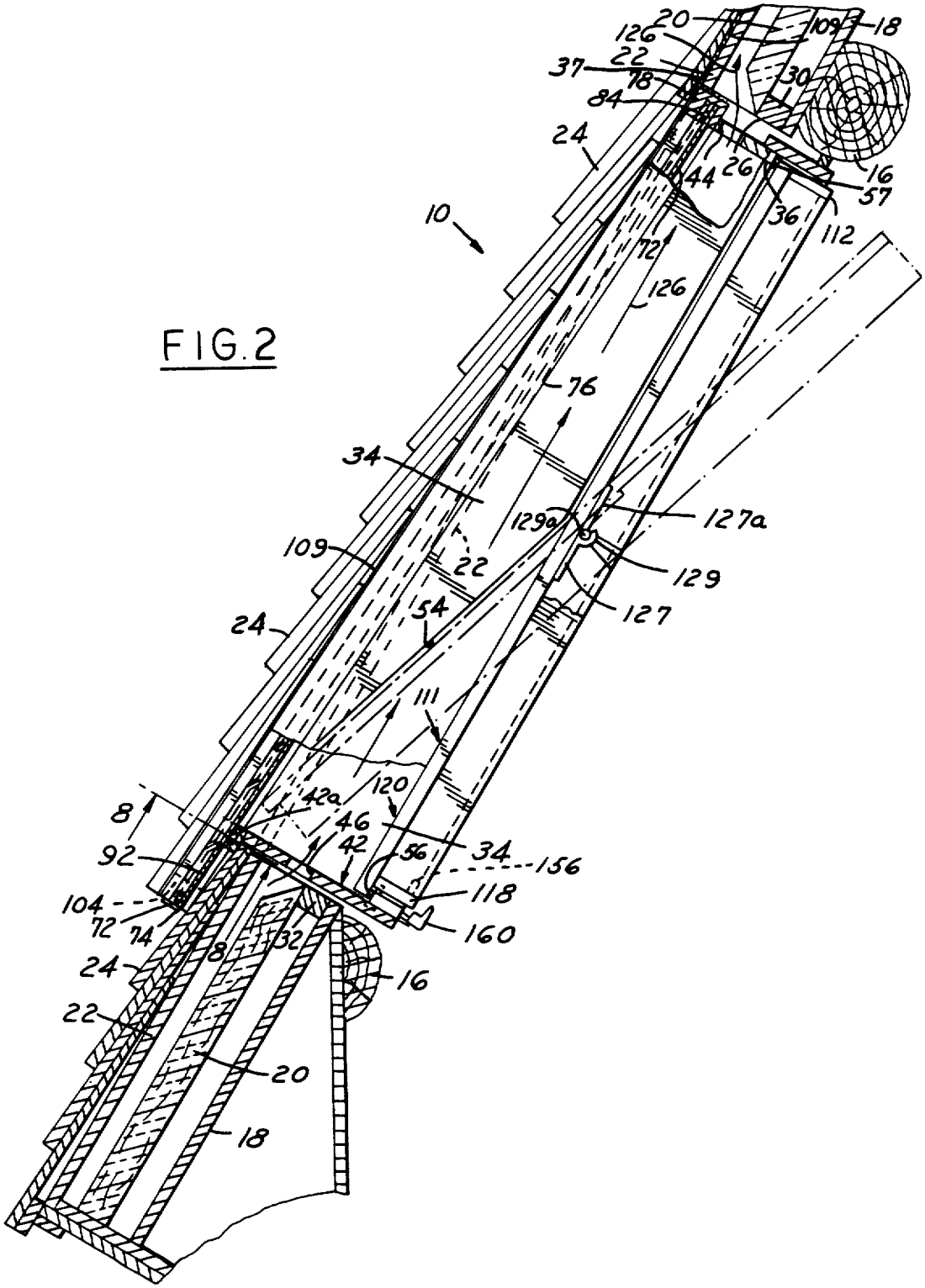
FIG. 2 is a cross-sectional view taken on line 2—2 of FIG. 1.

The casing 34 is supported at the header end in the roof opening on an angle member or the like 37, one leg of which is fastened to a header member 76 atop the casing header 36, and the other leg overlies the roof boards 22 with the upper edge of the casing at the header substantially flush with the roof boards as shown in FIGS. 1 and 2. The lower end of the casing at the bottom rail is supported in the roof opening by the side members 74 and 78 as later explained.

Figure 3:
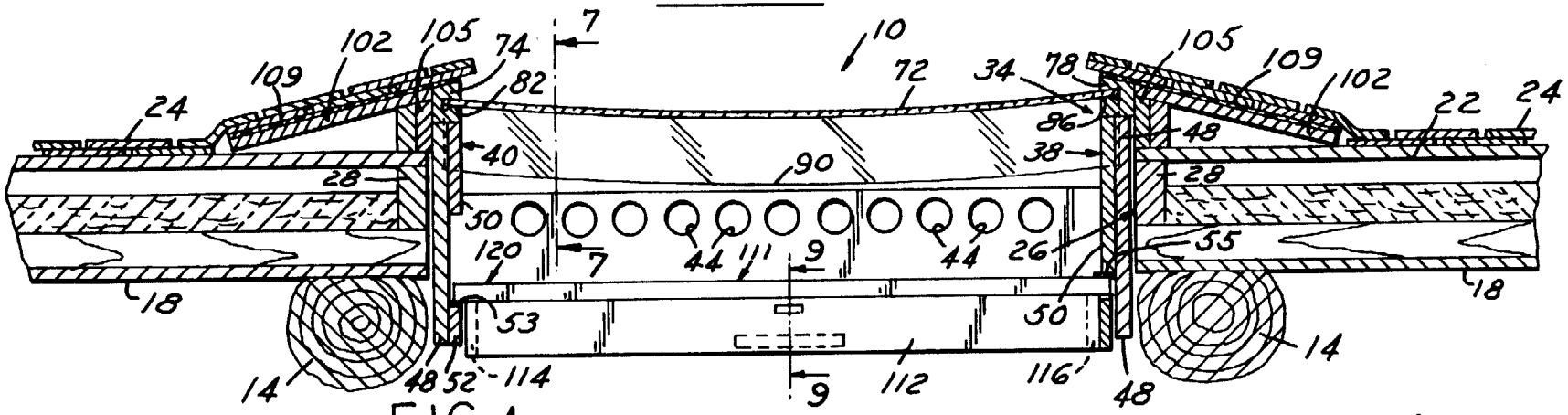
FIG. 3 is a cross-sectional view taken on line 3—3 of FIG. 1.
Figure 4:
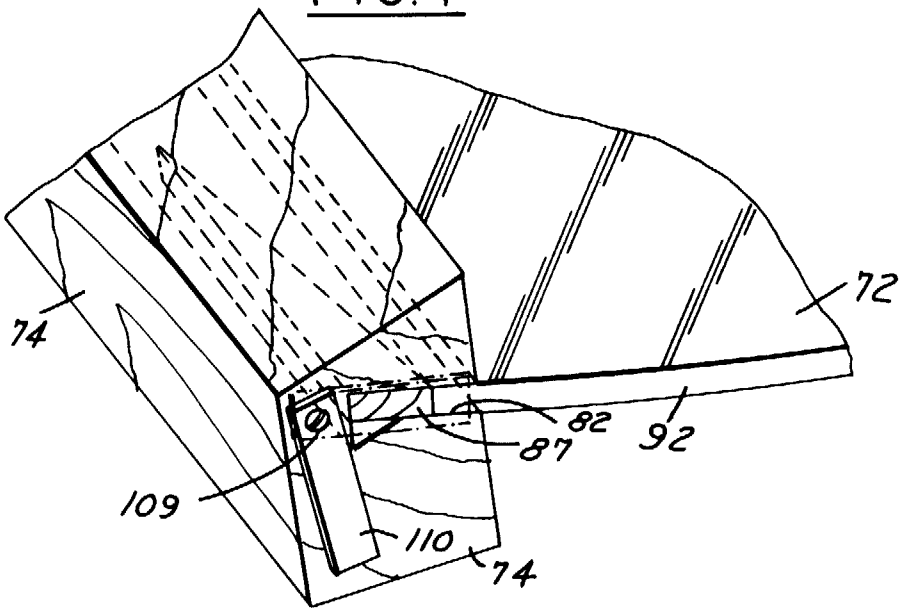
FIG. 4 is a perspective view showing the means for locking the outer skylight panel in place.

The casing 34 includes means for mounting an outside translucent, preferrably transparent, skylight panel 72 which desirably may be formed of quarter-inch plexiglass. Such mounting means comprises three grooved members 74, 76 and 78, which are mounted on the upper edges of the side and header rails and constitute part of the casing 34. Members 74, 76 and 78 form an upper outside edge on the casing over which the roofing shingles 24 or other roof covering may extend to overhang somewhat the skylight panel 72. Each of the members 74, 76 and 78 is provided with a groove for receiving the marginal edge of the skylight panel, such grooves being shown at 82, 84 and 86 in FIGS. 2–4 of the drawings. The panel is bowed downwardly thereby forming a concave or trough-like structure which extends longitudinally of the casing when the panel 72 is seated in the grooves as best shown in FIGS. 1 and 3. The groove 84 in the header member is curved to receive the margin of the skylight panel and helps to hold it in its trough-like configuration. As shown in FIG. 4, a wedge 87 is inserted in the groove 82, a similar wedge being provided for the groove 86 in the opposite side rail, and such wedges serve to bow the panel 72 downwardly at its lower edge. The bottom rail member 42 is provided with a concave upper surface 90 which conforms the panel 72 to the concave configuration. A plate 110 swingably mounted on a fastener 109 may be moved upwardly (counter-clockwise) from the position shown in FIG. 4, to overlie the wedge and marginal edge 92 of the skylight panel 72 to retain the same in place. The grooves 82 and 86 permit the panel 72 to be slidably inserted into the casing after the casing has been mounted in the roof opening. The lower end 92 of the outside skylight panel 72 overlies the shingles 24 adjacent the bottom rail 42 as best shown in FIGS. 1, 2 and 8 whereby water collecting on the skylight panel will be channeled to the center of the panel as a result of its concave shape and will flow down the center of the panel to be deposited on the shingles 24 extending below the bottom rail 42. Thus the skylight will shed water readily keeping it away from the side rails. It will be apparent that by grasping the lower edge 92 of the outside skylight panel, the same may be withdrawn downwardly for removal from the skylight assembly.

It will be noted in FIG. 1 that the side rail members 74 and 78 extend beyond the bottom rail 42 to overlie the shingles 24 of the roof and support the lower end of the casing 34 in the roof opening. To fill the space between the upper edges 100 of the members 74 and 78 and the surface of the shingles 24 adjacent the side rails, a polygonal flaring piece 102, a filler triangle 104 and an elongated wedge-shaped member 105 are disposed on the roof adjacent each side rail as best shown in FIG. 1. The flaring piece 102 is provided with a long edge 103 overlying the side rails and wedge 105 and also has tapering edges 106 and 108 which overlie the roof boards. Shingles 24 are laid over the flaring piece as shown in FIG. 1 to provide a smooth transition from the upper edges of the side rails to the roof line. A waterproof membrane 109 is laid around the two sides and the header rail of the skylight frame and over the upper edges of the frame. The membrane is disposed above the polygonal flaring piece 102 and extends out over the roof boards. The membrane serves to insure a watertight installation.

It will be noted from FIGS. 1 and 6 that the upper edge of the casing 34 is mounted in the roof opening slightly askew to the roof line with the member 76 atop the header rail 36 being disposed so that its upper edge is flush with the upper surface of the roof boards 22 while the members 74 and 78 are at least partially below the roof line at the header and are above the shingles adjacent the bottom rail. To accomplish this the upper edge 48a of the casing sides 48 are cut at a long taper of from $2\frac{1}{4}°$ to 6° and diverge from the lower edge 48b from the header end toward the bottom rail end. In addition, the header rail comprising the header 36 and header rail member 76 are shallower than the bottom rail comprising the bottom rail 42 and the rail member 42a. As a result of this construction, the exposed edge 48b of the side rails and the lower edge 42b of the bottom rail parallel the ceiling line while the outer edge of the casing overlies the roof boards and shingles adjacent the bottom rail yet is flush with the roof line at the header. As a consequence the shingles may be carried up over the casing sides and header and yet are beneath the side members 74 and 78 adjacent the bottom rail. The advantage of this construction will become apparent as this description proceeds.

Disposed within the casing spaced below the outside skylight panel 72 is a translucent (preferably transparent) inside skylight panel 111. This panel comprises a rectangularly-shaped frame having header rail 112, side rails 114 and 116 and a bottom rail 118, suitably joined at their meeting ends. The inside skylight panel also includes a translucent or transparent panel element 120 which may be a double glazed panel as shown in FIG. 9 and bedded against the upper edge of the frame on a silicone sealant or the like 121, with L-shaped retainers 123 overlying the upper face of the panel and extending down alongside the side rails 114 and 116 and secured thereto to hold the panel on the frame.

Figure 5:
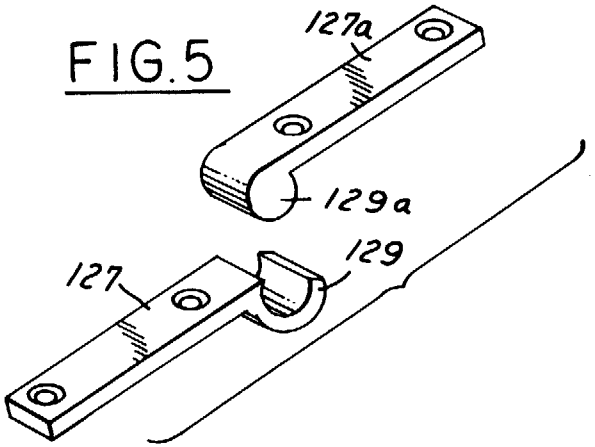
FIG. 5 is a perspective view of the inner skylight panel hinge.

This inside skylight panel is mounted within the casing spaced from the outside skylight panel to provide an insulating air space therebetween and is movable to be opened to admit air to and from the room beneath the skylight into the space beneath the outside panel whereby air within such room may pass upwardly through the opening inside skylight panel and into the opening 44 to carry air from the room below up along the underside of the roof as shown by the arrows 126 in FIG. 2. The inside skylight is mounted for pivotable movement as shown in phantom outline in FIG. 3 by hinge means disposed substantially at the center of balance of the inside skylight panel. The hinge means may comprise as shown in FIG. 5, a pair of hinge elements 127 and 127a with the former attached to the upper edge 53 of the member 52 and the latter to the side frame members of the inner skylight panel. The hinge elements have interfitting portions 129 and 129a whereby the inner panel may be swung between the positions shown in FIG. 2.

Figure 9:
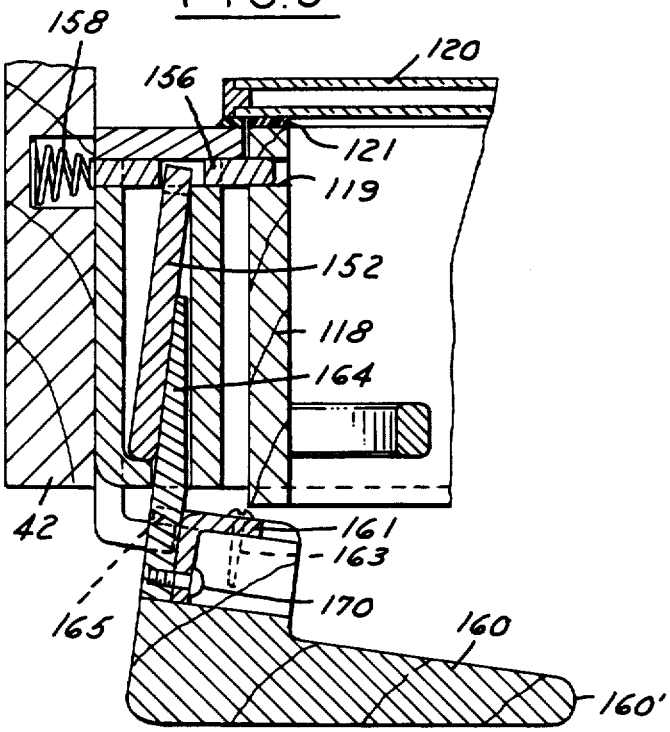
FIG. 9 is a fragmentary cross-sectional view taken on the line 9—9 of FIG. 3.
Figure 10:
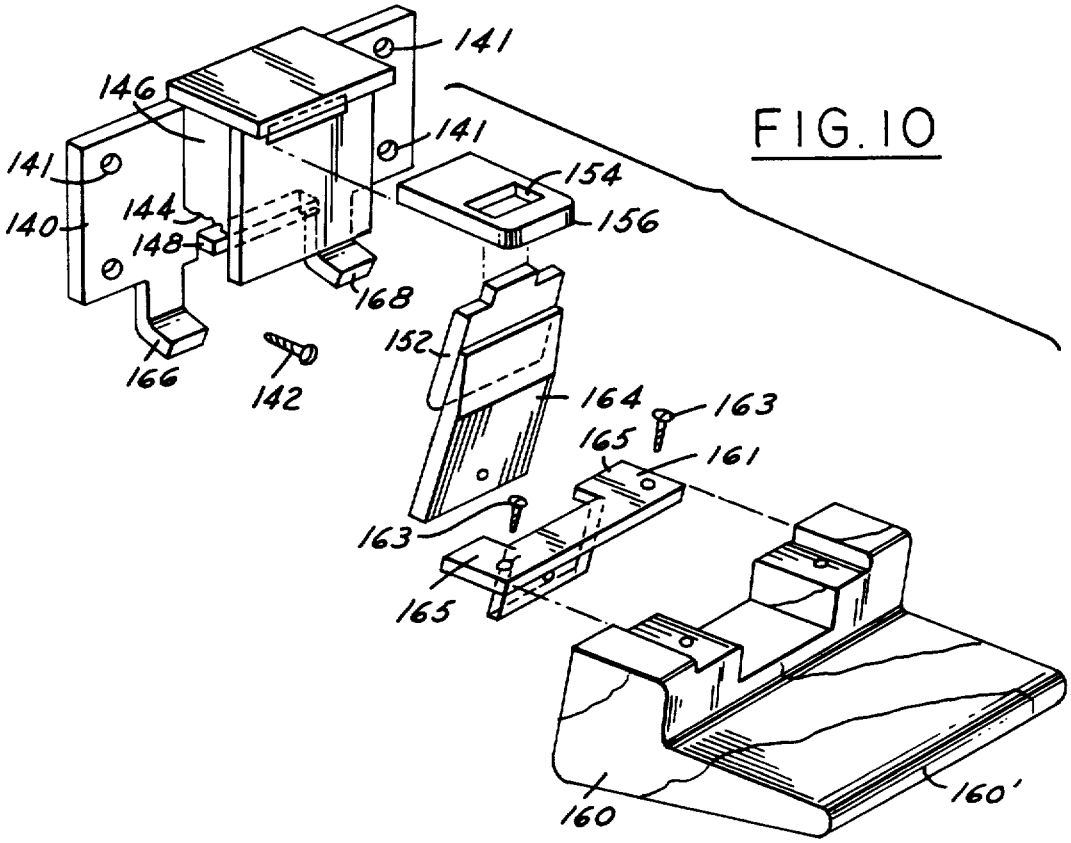
FIG. 10 is an exploded view of the locking mechanism of FIG. 9.

The inside skylight is locked in closed position by a latch assembly shown in FIGS. 9 and 10. The latch assembly is mounted on the bottom rail 42 adjacent its lower edge. The latch assembly is mounted in a notch in the member 56 on the bottom rail 42. The latch assembly includes a plate 140 having holes 141 through which fasteners 142 extend into the bottom rail 42 to secure the latch thereto. On the plate 140 is a downwardly opening chamber 144 defined by walls 146 integral with the plate 140. The bottom of the chamber is partially closed by an in-turned lip 148 pressed from the plate 140 and adapted to catch and pivotally support an actuating lever 152 the upper end of which is received within a notch 154 of a spring-loaded latching bolt 156. The spring 158 for the bolt is disposed within a provided recess within the bottom rail 42. The spring urges the latching bolt outwardly to enter a provided notch 119 in the bottom member 118 of the inside skylight.

Extending up into the lower end of the chamber 144 adjacent the lever 152 is a primary actuating lever 164. This lever is attached to a handle assembly 160 having a mounting bracket 161 attached by fasteners 163 to the handle. Ears 165 of bracket 161 overlie the ears 166 and 168. When the handle assembly 160 is attached by fastener 170 to the lever 164 the ears 165 are trapped above ears 166 and 168 within the handle assembly and the mechanism is thus locked together within the chamber 144. However, upon removal of the fastener 170 the latching mechanism may be readily disassembled.

By lifting the handle 160 at its outer end 160', the handle is caused to pivot on the ears 166 and 168 causing the levers to shift the latching bolt 156 to the left as shown in FIG. 9 thereby disengaging the inside skylight and permitting it to be raised to the phantom outlined position of FIG. 2. Conversely, when the skylight is tilted back to the solid outline position, it may be locked in its closed position.

It will be observed from a review of the disclosure herein that I have designed a skylight which may be installed and sealed in place without the use of metal flashing. It is only necessary for the installer after the skylight casing has been inserted and fastened in the roof opening to apply the trim pieces 104, 105 and 102 and then cover them with the flexible membrane 109 as above indicated and finish the roofing by applying the shingles over the membrane to cover the exposed upper edges of the members 74, 76 and 78. The shingles adjacent the bottom rail 42 will simply butt up against such rail. The installer may desire to caulk such joint with urethane sealant or the like. The outside skylight panel is then inserted in the groove between the side rails and the panel slid upwardly to final position, forced into its bowed or concave condition by the header groove 84 and the wedges 87, and then locked in place by the retainers 110.

What is claimed is:

1. A skylight assembly for a sloping roof comprising in combination:

a rectangular casing having a header, side and bottom rails, to be received in a complementary-shaped hole in a roof;

a translucent outside skylight panel mounted in said casing and bridging the space between the rails and extending over and beyond the bottom rail; [and]

*an inside translucent skylight panel disposed within the casing spaced from the outside skylight panel and bridging between the rails to form an air space between the panels;* means on said casing for supporting the *outside skylight* panel beneath the roof covering along the header and side rails while supporting the panel to overhang the roof covering along the bottom rail.

2. The invention defined by claim 1 wherein said outside skylight panel is of an elongated shallow trough-like configuration.

3. The invention defined by claims 1 or 2 wherein the side rails are disposed closer together than the width of the skylight panel in a flat planar configuration whereby the *outside* panel is held deformed in said trough-like configuration between the side rails.

4. The invention defined by claims 1 or 2 wherein the side rails are disposed closer together adjacent the bottom rail than the width of the *outside* skylight panel in a flat planar configuration whereby the panel is held deformed in said trough-like configuration between the side rails adjacent the bottom rail, and said header having means for engaging the *outside* skylight panel and holding it at the header in said trough-like configuration.

5. The invention defined by claims 1 or 2 wherein means are provided for supporting the *outside* skylight panel in the casing for slidable insertion or removal over the bottom rail of the casing.

6. The invention defined by claims 1 or 2 wherein an inside translucent skylight panel is disposed within the casing spaced from the outside skylight panel and bridging between the rails to form an air space between the panels.

7. The invention defined by claim 6 wherein *said* vent means are provided in the header and bottom rails to vent the space between the panels to spaces below the roof in which the assembly is mounted.

8. The invention defined by claim 1 or 2 wherein [an inside translucent skylight panel is disposed within the casing spaced from the outside skylight panel and] vent means are provided in the rails to allow air flow beneath the roof in which the skylight assembly is installed through the space between the two skylight panels.

9. A skylight assembly for sloping roof comprising common combination:

a rectangular casing having a header, side and bottom rails, to be received in a complementary shaped opening in a roof;

a translucent outside skylight panel mounted in said casing and bridging the space between the rails and extending over and beyond the bottom rail;

means on said casing for supporting the outside panel beneath the covering of a roof in which the assembly is installed along the header and side rails while supporting the panel to overhang the roof covering along the bottom rail;

an inside translucent skylight panel in said casing spaced below the outside skylight panel and bridging between the rails; and means for supporting the inside skylight panel for swingable in movement toward and away from the outside skylight panel to vent the space between the panels into a room beneath the assembly.

10. Invention defined by claim 9 wherein said means for swingably supporting the inside skylight panel is disposed substantially at the center of balance of such panel.

11. Invention defined by claim 1 wherein said header rail is shallower than the bottom rail and the side rails taper from a shallower end at the header to a deeper end at the bottom rail whereby upon mounting the casing in a roof with the inside exposed surfaces of the side rails uniformly spaced from the underside of the roof, the header rail may be flush with the outside of the roof line while the bottom rail projects above the outside roof line and the outside exposed edges of the side rails gradually taper upwardly away from the outside roof line from the header to the bottom rail; and means for bridging between the roof line adjacent the side rails and the exposed surfaces of the side rails whereby a roof covering will make a gradual transition therebetween.

12. The invention of claim 11 wherein the side rails taper from the header rail to the bottom rail along the outside exposed surfaces of each at an angle of from between 2¼° to 6°.

13. The invention as defined in claim 11 wherein a waterproof flexible membrane extends from the header and side rails outwardly over the roof line to underlie a roof covering surrounding the skylight assembly when it is mounted in a roof.

14. A skylight assembly for a sloping roof comprising in combination:

a rectangular casing having a header, side and bottom rails, to be received in a complementary shaped opening in a roof;

said header rail being shallower than said bottom rail and the side rails tapering from a shallower end at the header to a deeper end at the bottom rail, whereby upon mounting the casing in a roof with the inside exposed surfaces uniformly spaced from the underside of the roof, the header rail may be flush with the outside of the roof line while the bottom rails projects above the roof line and the outside exposed edges of the side rails gradually taper upwardly away from the outside roof line from the header to the bottom rail;

a translucent outside skylight panel mounted in said casing and bridging the space between the rails and extending over and beyond the bottom rail, said translucent outside skylight panel being concave in a trough-like formation extending from the header rail to the bottom rail;

means on said casing for supporting the outside panel beneath the covering of a roof in which the skylight assembly is installed along the header and side rails while supporting the panel to overhang the roof covering along the bottom rail;

an inside translucent skylight panel swingably supported in said casing below the outside skylight panel and bridging between the rails;

means for locking the inside skylight panel in a closed position spaced substantially uniformly from said outside skylight panel; and a vent means in the header rail and in the bottom rail to allow air flow from beneath the roof in which the skylight assembly is mounted into and from the space between the outside and inside skylight panels.

*15. A skylight assembly for a sloping roof comprising in combination:*

*a rectangular casing having a header, side and bottom rails, to be received in a complementary-shaped hole in a roof;*

*a translucent outside skylight panel mounted in said casing and bridging the space between the rails;*

*an inside translucent skylight panel mounted in the casing spaced from the outside skylight panel and bridging the space between the rails to form an air space within the casing between the panels; and*

*vent means in the casing venting the space between the panels into the space below the roof in which the assembly is mounted.*

*16. The invention as in claim 15 further including means for supporting the inside skylight panel for movement between closed and open positions to vent the space between the panels directly into a room beneath the assembly.*

*17. The invention defined by claim 15 wherein the outside skylight panel extends over and beyond the bottom rail to overlie the roof adjacent the bottom rail.*

*18. The invention as defined by claim 15 wherein said vent means is provided in some of said casing rails.*

*19. The invention defined by claim 1 or 2 wherein vent means are provided in the casing to vent the space between the panels below the roof in which the assembly is mounted.*

* * * * *